United States Patent Office 3,407,197
Patented Oct. 22, 1968

3,407,197
2H-1,2,3-BENZOTHIADIAZINE-1,1-DIOXIDES AND PROCESS FOR THEIR PRODUCTION
John B. Wright, Kalamazoo, Mich., assignor to The Upjohn Company, Kalamazoo, Mich., a corporation of Delaware
No Drawing. Filed Aug. 10, 1966, Ser. No. 571,402
8 Claims. (Cl. 260—243)

ABSTRACT OF THE DISCLOSURE 2H-1,2,3-benzothiadiazine-1,1-dioxides are prepared by reacting in an inert solvent a 2-benzoylbenzenesulfonyl halide with hydrazine, hydrazine hydrate, or alkylhydrazine. The corresponding 3,4-dihydro derivatives can be prepared by a subsequent hydrogenation. The foregoing compounds are useful as intermediates for the preparation of disinfectants, mothproofing agents, pickling inhibitors, and herbicides, and also for the preparation of 4-phenyl-2H-1,2,3-benzothiadiazine-1,1-dioxides which contain a basic side chain.

This invention is directed to benzothiadiazine dioxides and to compounds derived therefrom.

The benzothiadiazine dioxides contemplated herein can be represented by the structural formula

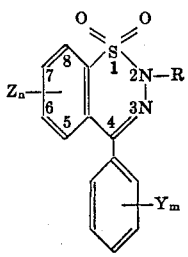

I wherein R can be hydrogen, alkyl, or alkanoyl radical, and Z and Y can be halo, trifluoromethyl, alkyl, or alkoxy radicals. The value for $n$ and $m$ can be an integer from 0 to 3, inclusive. The alkyl portion of the above-enumerated radicals can contain from 1 to 4 carbon atoms, inclusive. Thus, the contemplated alkyl radicals are methyl, ethyl, propyl, isopropyl, butyl, isobutyl, sec.-butyl, and tert.-butyl; the contemplated alkanoyl radicals are acetyl, propionyl, the butyryl, and the valeryl; and the contemplated alkoxy radicals are methoxy, ethoxy, the propoxy, and the butoxy. The contemplated halo radicals are fluoro, chloro, bromo, and iodo.

Also contemplated and within the purview of the present invention are the 3,4-dihydro derivatives of the foregoing that can be represented by the structural formula

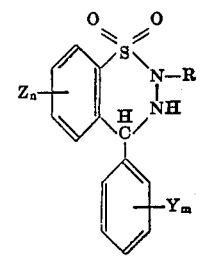

II wherein R, Z, Y, $m$, and $n$ have the same meaning as above in Formula I.

Compounds of the type represented by Formula II can also exist in the protonated or acid addition salt form. Stable acid addition salts can be formed with acids such as hydrochloric, hydrobromic, sulfuric, phosphoric, nitric, acetic, benzoic, salicylic, glycolic, succinic, nicotinic, tartaric, maleic, malic, pamoic, methanesulfonic, picric, cyclohexanesulfamic, lactic, and the like.

The compounds represented by Formula I can be prepared by reacting a 2-benzoylbenzenesulfonyl halide with hydrazine. The reaction is usually carried out in an inert organic solvent such as pyridine, a lower aliphatic alcohol, e.g., methanol, ethanol, propanol, or the like, at reflux conditions. Also, a basic reaction medium is desirable. The latter condition can be achieved by the choice of solvent, e.g., pyridine, by the presence of excess hydrazine, or by the addition of a basic salt such as sodium acetate, sodium bicarbonate, sodium carbonate, potassium carbonate, or the like, to the solvent.

If hydrazine or hydrazine hydrate is employed as a reactant, the produced 4-phenyl-2H-1,2,3-benzothiazine-1,1-dioxide is unsubstituted in the 2-position. Substitution in this position can be achieved, however, by reacting the unsubstituted compound with an alkyl halide, the reaction being carried out in an inert organic solvent such as methanol, ethanol, propanol, or the like, and in the presence of a basic condensing agent such as sodium hydroxide; or with an alkanoyl halide, in the presence of an inert solvent such as chloroform, methylene chloride, benzene, pyridine, or the like.

Alternatively, a compound of the type shown by Formula I and alkyl-substituted in the 2-position can be produced directly from a 2-benzoylbenzenesulfonyl chloride by reacting the latter with an alkylhydrazine rather than hydrazine at substantially the same reaction conditions.

Compounds of the type represented by Formula II can be produced by hydrogenating the corresponding Formula I compound in the presence of Raney nickel or a noble metal catalyst such as platinum or the like. Optionally, an inert organic solvent such as dioxane, acetic acid, or ethanol-diethylformamide mixtures can be employed. Chemical reducing agents such as sodium borohydride, lithium aluminum hydride, or the like, can also be employed.

The overall synthetic route for the preparation of the compounds of this invention is set forth schematically below, wherein Z, Y, m, and n have the same meaning as above, R' is alkyl or alkanoyl, R'' is alkyl, and X is halogen (preferably chlorine or bromine):

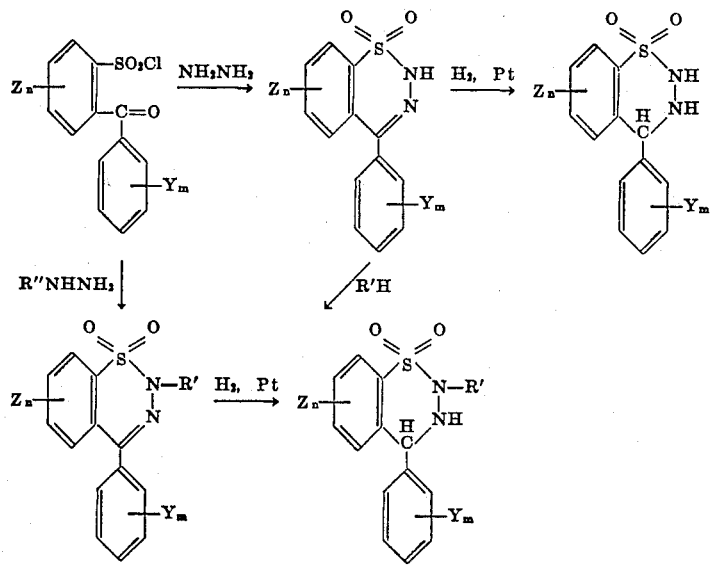

The 2-benzoylbenzenesulfonyl halides (IV) that can be employed in the above process can be prepared in accordance with the procedure set forth in Remsen et al., Am. Chem. J. 17, 354 (1895). In addition, 2-aminobenzophenones (III), a well-known class of compounds, can be reacted with nitrous acid and then with sulfur dioxide and a cupric halide in an acid medium, e.g., hydrochloric acid, to produce the corresponding 2-benzoylbenzenesulfonyl halides (IV) as is shown below for the preparation of 2-benzoylbenzenesulfonyl chlorides:

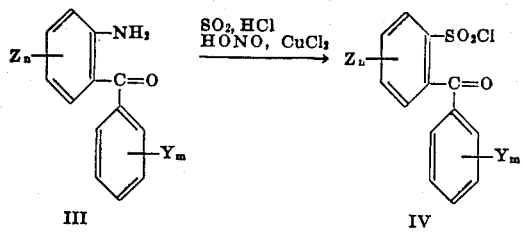

Thus, 2-benzoyl-6-bromobenzenesulfonyl chloride can be derived from 2-amino-3-bromobenzophenone, 2-benzoyl-5-bromobenzenesulfonyl chloride from 2-amino-4-bromobenzophenone, 2-benzoyl-4'-bromobenzenesulfonyl chloride from 2-amino-4'-bromobenzophenone, 2-benzoyl-4-bromobenzenesulfonyl chloride from 2-amino-5-bromobenzophenone, 2-benzoyl-3-bromobenzenesulfonyl chloride from 2-amino-6-bromobenzophenone, 2-benzoyl-4,6-dibromobenzenesulfonyl chloride from 2-amino-3,5-dibromobenzophenone, 2-benzoyl-4-bromo-2'-fluorobenzenesulfonyl chloride from 2-amino-2'-fluoro-5-bromobenzophenone, 2-benzoyl-4-bromo-5-methoxybenzenesulfonyl chloride from 2-amino-4-methoxy-5-bromobenzophenone, 2 - benzoyl - 4 - bromo - 4' - methylbenzenesulfonyl chloride from 2-amino-4'-methyl-5-bromobenzophenone, 2-benzoyl-2'-chlorobenzenesulfonyl chloride from 2-amino-2'-chlorobenzophenone, 2-benzoyl-6-chlorobenzenesulfonyl chloride from 2-amino-3-chlorobenzophenone, 2-benzoyl-5-chlorobenzenesulfonyl chloride from 2-amino-4-chlorobenzophenone, 2-benzoyl-4'-chlorobenzenesulfonyl chloride from 2-amino-4'-chlorobenzophenone, 2-benzoyl-4-chlorobenzenesulfonyl chloride from 2-amino-5-chlorobenzophenone, 2-benzoyl-3-chlorobenzenesulfonyl chloride from 2-amino-6-chlorobenzophenone, 2-benzoyl-2',4-dichlorobenzenesulfonyl chloride from 2-amino-2',5-dichlorobenzophenone, 2-benzoyl-4,6-dichlorobenzenesulfonyl chloride from 2-amino-3,5-dichlorobenzophenone, 2-benzoyl-4,5-dichlorobenzenesulfonyl chloride from 2-amino-4,5-dichlorobenzophenone, 2-benzoyl-4,4'-dichlorobenzenesulfonyl chloride from 2-amino-4',5-dichlorobenzophenone, 2-benzoyl-4-chloro-2'-fluorobenzenesulfonyl chloride from 2-amino-2'-fluoro-5-chlorobenzophenone, 2 - benzoyl - 4 - chloro - 3' - fluorobenzenesulfonyl chloride from 2-amino-3'-fluoro-5-chlorobenzophenone, 2-benzoyl-4-chloro-4'-fluorobenzenesulfonyl chloride from 2-amino-4'-fluoro-5-chlorobenzophenone, 2-benzoyl-4-methyl-2'-chlorobenzenesulfonyl chloride from 2-amino-2'-chloro-5-methylbenzophenone, 2-benzoyl-4'-methyl-3'-chlorobenzenesulfonyl chloride from 2-amino-3'-chloro-4'-methylbenzophenone.

In like manner, 2-amino-2'-chloro-4,5-dimethylbenzophenone yields 2-benzoyl-4,5-dimethyl-2'-chlorobenzenesulfonyl chloride, 2-amino-2',4'-dichloro-4,5-dimethylbenzophenone yields 2-benzoyl-4,5-dimethyl-2',4'-dichlorobenzenesulfonyl chloride, 2-amino-2',5'-dichloro-4,5-dimethylbenzophenone yields 2-benzoyl-4,5-dimethyl-2',5'-dichlorobenzenesulfonyl chloride, 2-amino-2'-methoxy-5-chlorobenzophenone yields 2-benzoyl-4-chloro-2'-methoxybenzenesulfonyl chloride, 2-amino-4'-methoxy-5-chlorobenzophenone yields 2-benzoyl-4-chloro-4'-methoxybenzenesulfonyl chloride, 2-amino-2'-methoxy-5-chloro-5'-methylbenzophenone yields 2-benzoyl-5'-methyl-4-chloro-2'-methoxybenzenesulfonyl chloride, 2-amino-2'-fluorobenzophenone yields 2-benzoyl-2'-fluorobenzenesulfonyl chloride, 2-amino-4'-fluorobenzophenone yields 2-benzoyl-4'-fluorobenzenesulfonyl chloride, 2-amino-5-fluorobenzophenone yields 2-benzoyl-4-fluorobenzenesulfonyl chloride, 2-amino-2'-fluoro-5-methylbenzophenone yields 2-benzoyl-4-methyl-2'-fluorobenzenesulfonyl chloride, 2-amino-2'-trifluoromethylbenzophenone yields 2-benzoyl-2'-trifluoromethylbenzenesulfonyl chloride, 2-amino-3-trifluoromethylbenzophenone yields 2-benzoyl-6-trifluoromethylbenzenesulfonyl chloride, 2-amino-3'-trifluoromethylbenzophenone yields 2-benzoyl-3'-trifluoromethylbenzenesulfonyl chloride, 2 - amino - 4 - trifluoromethylbenzophenone yields 2-benzoyl-5-trifluoromethylbenzenesulfonyl chloride, 2 - amino - 2',5 - di(trifluoromethyl) benzophenone yields 2-benzoyl-2',4-di(trifluoromethyl) benzenesulfonyl chloride.

Similarly, 2-amino-2'-methoxybenzophenone produces 2-benzoyl-2'-methoxybenzenesulfonyl chloride, 2-amino-4-methoxybenzophenone produces 2-benzoyl-5-methoxybenzenesulfonyl chloride, 2-amino-4'-methoxybenzophenone produces 2-benzoyl-4'-methoxybenzenesulfonyl chloride, 2-amino-5-methoxybenzophenone produces 2-benzoyl-4-methoxybenzenesulfonyl chloride, 2-amino-2',4-dimethoxybenzophenone produces 2-benzoyl-2',5-dimethoxybenzenesulfonyl chloride, 2-amino-3,4-dimethoxybenzophenone produces 2-benzoyl-5,6-dimethoxybenzenesulfonyl chloride, 2-amino-3',4'-dimethoxybenzophenone produces 2-benzoyl-3',4'-dimethoxybenzenesulfonyl chloride, 2-amino-4,4',5-trimethoxybenzophenone produces 2-benzoyl-4,4',5-trimethoxybenzenesulfonyl chloride, 2-amino-2',5-dimethyl-3'-methoxybenzophenone produces 2-benzoyl-2',4-dimethyl-3'-methoxybenzenesulfonyl chloride, 2 - amino - 2',3' - dimethyl - 4' - methoxybenzophenone produces 2-benzoyl-4'-methoxy-2',3'-dimethylbenzenesulfonyl chloride, 2-amino-2',5'-dimethyl-4'-methoxybenzophenone produces 2-benzoyl-2',5'-dimethyl-4'-methoxybenzenesulfonyl chloride, 2-amino-2',4-dimethyl-5-methoxybenzophenone produces 2-benzoyl-4-methoxy-2',5-dimethylbenzenesulfonyl chloride, 2-amino-2'-methyl-5-methoxybenzophenone produces 2-benzoyl-4-methoxy-2'-methylbenzenesulfonyl chloride, 2-amino-3,4-dimethylbenzophenone produces 2-benzoyl-5,6-dimethylbenzenesulfonyl chloride, 2-amino-3-propyl-5-butylbenzophenone produces 2-benzoyl-4-butyl-6-propylbenzenesulfonyl chloride, 2-amino-4-ethyl-4'-butylbenzophenone produces 2-benzoyl-4'-butyl-5-ethylbenzenesulfonyl chloride, etc.

Methods for preparation of 2-aminobenzophenones are taught by Lothrop et al., J. Am. Chem. Soc. 65, 363 (1943) and Sternbach et al., J. Org. Chem. 27, 3781 and 3788 (1962).

The compounds of this invention where R is hydrogen can be chlorinated thereby producing 2-chloro-4-phenyl-2H-1,2,3-benzothiadiazine-1,1-dioxides which are active chlorine compounds and therefore active disinfectants similar to those disclosed in U.S. Patent 3,115.495.

In addition, all compounds of the type represented by Formula I are useful as intermediates for the preparation of compounds of the type shown by Formula II which, in turn, form salts with fluosilicic acid. Such salts are useful as mothproofing agents in accordance with the teachings of U.S. Patent No. 1,915,334 and U.S. Patent No. 2,075,359.

Salts of the compounds of Formula II with thiocyanic acid condense with formaldehyde to form resinous materials useful as pickling inhibitors according to U.S. Patent No. 2,425,320 and U.S. Patent No. 2,606,155.

Salts of the compounds of Formula II with trichloroacetic acid are useful as herbicides against Johnson grass, yellow foxtail, green foxtail, Bermuda grass, quack grass, and the like.

The following examples further illustrate the present invention.

EXAMPLE I

*Preparation of 2-benzoyl-4-chlorobenzenesulfonyl chloride*

A solution was prepared from 2 - amino - 5 - chlorobenzophenone (about 32.4 grams, 0.14 mole), acetic acid (about 140 milliliters), and concentrated hydrochloric acid (about 48 milliliters). The solution was chilled to about 0°–5° C. and a solution of sodium nitrite (about 10.6 grams) in water (about 17 milliliters) was added thereto with stirring.

The resulting mixture was stirred for about one-half hour and then a solution of sulfur dioxide (about 33.6 grams) in acetic acid (about 110 milliliters) and a solution of cupric chloride (about 5.6 grams) in water (about 10 milliliters) were added to the mixture.

The thus prepared reaction mass was permitted to warm to about room temperature over a time period of about one hour with stirring, and then poured on cracked ice, and filtered. The recovered filter cake was washed well with water. About 41.6 grams of a pale yellow solid melting at about 126°–130° C. was obtained. The solid was then twice recrystallized from cyclohexane thereby achieving a constant melting point of about 129°–131° C. The solid was identified as 2 - benzoyl - 4 - chlorobenzenesulfonyl chloride, obtained in about 94 percent yield.

*Analysis.*—Calcd. for $C_{13}H_8Cl_2O_3S$: C, 49.54; H, 2.56; Cl, 22.50; S, 10.17. Found: C, 49.86; H, 2.73; Cl, 22.35; S, 9.87.

EXAMPLE II

*Preparation of 4-phenyl-2H-1,2,3-benzothiadiazine-1,1-dioxide*

A mixture of 2 - benzoylbenzenesulfonyl chloride (about 13.3 grams, 0.048 mole), 95 weight per cent ethanol (about 100 milliliters), hydrazine hydrate (about 2.38 grams, 0.048 mole), and sodium acetate (about 7.8 grams, 0.095 mole) was stirred and refluxed for about 3 hours and then concentrated in vacuo. The obtained residue was triturated with ice water and filtered. The recovered filter cake was recrystallized from ethanol.

About 4.8 grams of yellow prismatic crystals melting at about 178° C. (dec.) was produced. Three additional recrystallizations from ethanol produced colorless prismatic crystals melting constantly at about 192° C. (dec.). The crystals were identified as 4 - phenyl - 2H - 1,2,3-benzothiadiazine-1,1-dioxide, obtained in about 39 percent yield.

*Analysis.*—Calcd. for $C_{13}H_{10}N_2O_2S$: C, 60.45; H, 3.90; N, 10.85; S, 12.41. Found: C, 60.45; H, 4.06; N, 11.05; S, 12.34.

EXAMPLE III

*Preparation of 6-chloro-4-phenyl-2H-1,2,3-benzothiadiazine-1,1-dioxide*

A mixture of 2 - benzoyl - 4 - chlorobenzenesulfonyl chloride (about 18.9 grams, 0.06 mole), hydrazine hydrate (about 3 grams, 0.06 mole), sodium acetate (about 9.85 grams, 0.12 mole), and ethanol (about 200 milliliters) was stirred and refluxed for about 3 hours. Thereafter, the ethanol was removed from the mixture by evaporation on a steam bath and under reduced pressure. The resulting residue was diluted with water, filtered, and the recovered filter cake washed well with water, and recrystallized from ethanol.

About 12.25 grams of yellow, prismatic crystals melting at about 184° C. (dec.) was recovered. An additional recrystallization from ethyl acetate raised the melting point to about 187° C. (dec.). The product was identified as 6 - chloro - 4 - phenyl - 2H - 1,2,3 - benzothiadiazine-1,1-dioxide.

*Analysis.*—Calcd. for $C_{13}H_9ClN_2O_2S$: C, 53.34; H, 3.10; Cl, 12.11; N, 9.57; S. 10.95. Found: C, 53.65; H, 3.26; Cl, 11.96; N, 9.89, 9.56; S, 11.12, 10.98.

EXAMPLE IV

*Preparation of 8-bromo-4-phenyl-2H-1,2,3-benzothiadiazine-1,1-dioxide*

A mixture of about equimolar amounts of 2 - benzoyl-6 - bromobenzenesulfonyl chloride and hydrazine hydrate are refluxed in ethanol and in the presence of an excess of sodium acetate for a sufficient time period to produce 8-bromo - 4 - phenyl - 2H - 1,2,3 - benzothiadiazine-1,1-dioxide. The obtained product is recovered employing conventional laboratory techniques.

EXAMPLE V

*Preparation of 6-chloro-4-(2-methoxyphenyl)-2H-1,2,3-benzothiadiazine-1,1-dioxide*

A mixture of about equimolar amounts of 2- benzoyl-4 - chloro - 2' - methoxybenzenesulfonyl chloride and hydrazine hydrate are refluxed in ethanol and in the presence of an excess of sodium acetate for a sufficient time period to produce 6-chloro - 4 - (2-methoxyphenyl)-2H-1,2,3 - benzothiadiazine - 1,1 - dioxide. The obtained product is recovered employing conventional laboratory techniques.

EXAMPLE VI

*Preparation of 6-methyl-4-(2-fluorophenyl)-2H-1,2,3-benzothiadiazine-1,1-dioxide*

A mixture of about equimolar amounts of 2-benzoyl-4-methyl-2'-fluorobenzenesulfonyl chloride and hydrazine hydrate are refluxed in ethanol and in the presence of an excess of sodium acetate for a sufficient time period to produce 6-methyl - 4 - (2 - fluorophenyl)-2H-1,2,3-benzothiadiazine-1,1-dioxide. The obtained product is recovered employing conventional laboratory techniques.

EXAMPLE VII

*Preparation of 6-trifluoromethyl-4-(2-trifluoromethylphenyl)-2H-1,2,3-benzothiadiazine-1,1-dioxide*

A mixture of about equimolar amounts of 2-benzoyl-2',4-di(trifluoromethyl)benzenesulfonyl chloride and hydrazine hydrate are refluxed in ethanol and in the presence of an excess of sodium acetate for a sufficient time period to produce 6-trifluoromethyl-4-(2-trifluoromethylphenyl)-2H-1,2,3-benzothiadiazine-1,1-dioxide. The obtained product is recovered employing conventional laboratory techniques.

EXAMPLE VIII

*Preparation of 6-methoxy-4-phenyl-2H-1,2,3-benzothiadiazine-1,1-dioxide*

A mixture of about equimolar amounts of 2-benzoyl-4-methoxybenzenesulfonyl chloride and hydrazine hydrate are refluxed in ethanol and in the presence of an excess of sodium acetate for a sufficient time period to produce 6-methoxy-4-phenyl-2H - 1,2,3-benzothiadiazine-1,1-dioxide. The obtained product is recovered employing conventional laboratory techniques.

EXAMPLE IX

*Preparation of 4-(3,4-dimethoxyphenyl)-2H-1,2,3 benzothiadiazine-1,1-dioxide*

A mixture of about equimolar amounts of 2-benzoyl-3',4'-dimethoxybenzenesulfonyl chloride and hydrazine hydrate are refluxed in ethanol and in the presence of an excess of sodium acetate for a sufficient time period to produce 4-(3,4-dimethoxyphenyl)-2H - 1,2,3-benzothiadiazine-1,1-dioxide. The obtained product is recovered employing conventional laboratory techniques.

EXAMPLE X

*Preparation of 6,7-dimethoxy-4-(4-methoxyphenyl)-2H-1,2,3-benzothiadiazine-1,1-dioxide*

A mixture of about equimolar amounts of 2-benzoyl-4,4',5-trimethoxybenzensulfonyl chloride and hydrazine hydrate are refluxed in ethanol and in the presence of an excess of sodium acetate for a sufficient time period to produce 6,7-dimethoxy-4-(4-methoxyphenyl) - 2H - 1,2,3-benzothiadiazine-1,1-dioxide. The obtained product is recovered employing conventional laboratory techniques.

EXAMPLE XI

*Preparation of 6-methoxy-4-(2-methylphenyl)-2H-1,2,3 benzothiadiazine-1,1-dioxide*

A mixture of about equimolar amounts of 2-benzoyl-4-methoxy - 2' - methylbenzenesulfonyl chloride and hydrazine hydrate are refluxed in ethanol and in the presence of an excess of sodium acetate for a sufficient time period to produce 6-methoxy-4-(2-methylphenyl)-2H-1,2,3-benzothiadiazine-1,1-dioxide. The obtained product is recovered employing conventional laboratory techniques.

EXAMPLE XII

*Preparation of 4-(2-methylphenyl)-2H-1,2,3-benzothiadiazine-1,1-dioxide*

A mixture of about equimolar amounts of 2-benzoyl-2'-methylbenzenesulfonyl chloride and hydrazine hydrate are refluxed in ethanol and in the presence of an excess of sodium acetate for a sufficient time period to produce 4-(2-methylphenyl) - 2H - 1,2,3 - benzothiadiazine-1,1-dioxide. The obtained product is recovered employing conventional laboratory techniques.

EXAMPLE XIII

*Preparation of 7,8-dimethyl-4-phenyl-2H-1,2,3-benzothiadiazine-1,1-dioxide*

A mixture of about equimolar amounts of 2-benzoyl-5,6-dimethylbenzenesulfonyl chloride and hydrazine hydrate are refluxed in ethanol and in the presence of an excess of sodium acetate for a sufficient time period to produce 7,8-dimethyl-4-phenyl-2H-1,2,3-benzothiadiazine-1,1-dioxide. The obtained product is recovered employing conventional laboratory techniques.

In a like manner, 7-bromo-4-phenyl-2H-1,2,3-benzothiadiazine-1,1-dioxide can be prepared from 2-benzoyl-5-bromobenzenesulfonyl chloride, 4 - (4 - bromophenyl)-2H-1,2,3-benzothiadiazine-1,1-dioxide from 2-benzoyl-4'-bromobenzenesulfonyl chloride, 6,8-dibromo - 4 - phenyl-2H-1,2,3-benzothiadiazine - 1,1 - dioxide from 2-benzoyl-4,6 - dibromobenzenesulfonyl chloride, 6 - bromo - 4 - (2-fluorophenyl)-2H-1,2,3-benzothiadiazine-1,1-dioxide from 2-benzoyl-4-bromo-2'-fluorobenzenesulfonyl chloride, 6,7-dimethyl-4-(2-chlorophenyl) - 2H-1,2,3-benzothiadiazine-1,1-dioxide from 2-benzoyl-4,5 - dimethyl - 2' - chlorobenzenesulfonyl chloride, 6,7 - dimethyl - 4 - (2,4 - dichlorophenyl)-2H-1,2,3-benzothiadiazine - 1,1 - dioxide from 2-benzoyl-4,5-dimethyl-2',4' - dichlorobenzenesulfonyl chloride, 6-chloro-4-(2-methoxy-5-methylphenyl) - 2H - 1,2,3-benzothiadiazine-1,1-dioxide from 2-benzoyl-5'-methyl-4-chloro-2'-methoxybenzenesulfonyl chloride, 4-(2-trifluoromethylphenyl) - 2H - 1,2,3 - benzothiadiazine-1,1-dioxide from 2-benzoyl - 2' - trifluoromethylbenzenesulfonyl chloride, 7-methoxy-4-phenyl-2H-1,2,3-benzothiadiazine - 1,1-dioxide from 2-benzoyl-5-methoxybenzenesulfonyl chloride, 4-(2,5-dimethyl-4-methoxyphenyl) - 2H - 1,2,3-benzothiadiazine-1,1-dioxide from 2-benzoyl-2',5'-dimethyl-4'-methoxybenzenesulfonyl chloride, 7-ethyl-4-(4-butylphenyl)-2H-1,2,3-benzothiadiazine - 1,1 - dioxide from 2-benzoyl-4'-butyl-5-ethylbenzenesulfonyl chloride, etc.

EXAMPLE XIV

*Preparation of 6-chloro-2-methyl-4-phenyl-2H-1,2,3-benzothiadiazine-1,1-dioxide*

6-chloro-4-phenyl-2H-1,2,3-benzothiadiazine-1,1-dioxide (about 2.93 grams, 0.01 mole) was dissolved in an aqueous 2.5 weight percent sodium hydroxide solution (about 20 milliliters) and placed in a flask fitted with an efficient reflux condenser. Thereafter, ethanol (about 30 milliliters) was added thereto. A red solution resulted.

The red solution was chilled in an ice bath, and methyl iodide (about 2 milliliters) was added to the solution which was then stirred at about room temperature for about 3.5 hours. Thereafter, more methyl iodide was added (about 2 milliliters) and the stirring continued for about 18 hours.

After the aforesaid period of stirring, the resulting admixture was diluted with an equal amount of water and filtered. The recovered precipitate was dissolved in benzene, and the obtained solution was washed once with an aqueous 1 weight percent sodium hydroxide solution and once with water.

Thereafter, benzene was removed from the solution by evaporation, and the remaining residue was recrystallized from ethanol. About 1.9 grams of crystals in the form of colorless needles melting at about 121–125° C. was recovered. An additional recrystallization from ethanol raised the melting point to about 124°–125° C. The crystals were identified as 6-chloro-2-methyl-4-phenyl-2H-1,2,3-benzothiadiazine-1,1-dioxide, obtained in about 62 percent yield.

*Analysis.*—Calcd. for $C_{14}H_{11}ClN_2O_2S$: C, 54.81; H, 3.62; Cl, 11.56; N, 9.13; S, 10.45. Found: C, 54.50; H, 3.48; Cl, 11.68; N, 9.10; S, 10.29.

In a similar manner, 8-bromo-2-methyl-4-phenyl-2H-1,2,3-benzothiadiazine-1,1-dioxide can be prepared from 8-bromo-4-phenyl-2H-1,2,3-benzothiadiazine-1,1-dioxide, 6-chloro-2-methyl-4-(2-methoxyphenyl)-2H-1,2,3-benzothiadiazine-1,1-dioxide from 6-chloro-4-(2-methoxyphenyl)-2H-1,2,3-benzothiadiazine-1,1-dioxide, 2,6-dimethyl-4-(2-fluorophenyl)-2H-1,2,3-benzothiadiazine-1,1-dioxide from 6-methyl-4-(2-fluorophenyl)-2H-1,2,3-benzothiadiazine-1,1-dioxide, 2-methyl-6-trifluoromethyl-4-(2-trifluoromethylphenyl)-2H-1,2,3-benzothiadiazine-1,1-dioxide from 6-trifluoromethyl-4-(2-trifluoromethylphenyl)-2H-1,2,3-benzothiadiazine-1,1-dioxide, etc.

Similarly, by using butyl iodide instead of methyl iodide a butyl radical can be placed in the 2-position on the end product. For example, 2-butyl-6-methoxy-4-phenyl-2H-1,2,3-benzothiadiazine-1,1-dioxide can be prepared from 6-methoxy-4-phenyl-2H-1,2,3-benzothiadiazine-1,1-dioxide, 2-butyl-4-(3,4-dimethoxyphenyl)-2H-1,2,3-benzothiadiazine-1,1-dioxide from 4-(3,4-dimethoxyphenyl)-2H-1,2,3-benzothiadiazine-1,1-dioxide, 2-butyl-6,7-dimethoxy-4-(4-methoxyphenyl)-2H-1,2,3-benzothiadiazine-1,1-dioxide from 6,7-dimethoxy-4-(4-methoxyphenyl)-2H-1,2,3-benzothiadiazine-4-dioxide, 2-butyl-6-methoxy-4-(2-methylphenyl)-2H-1,2,3-benzothiadiazine-1,1-dioxide from 6-methoxy-4-(2-methylphenyl)-2H-1,2,3-benzothiadiazine-1,1-dioxide, 2-butyl-4-(2-methylphenyl)-2H-1,2,3-benzothiadiazine-1,1-dioxide from 4-(2-methylphenyl)-2H-1,2,3-benzothiadiazine-1,1-dioxide, 2-butyl-7,8-dimethyl-4-phenyl-2H-1,2,3-benzothiadiazine-1,1-dioxide from 7,8-dimethyl-4-phenyl-2H-1,2,3-benzothiadiazine-1,1-dioxide, etc.

EXAMPLE XV

*Preparation of 6-chloro-2-methyl-4-phenyl-2H-1,2,3-benzothiadiazine-1,1-dioxide*

2-benzoyl-4-chlorobenzenesulfonyl chloride (about 9.45 grams, 0.03 mole) was discovered in pyridine (about 25 milliliters) and cooled below about 40° C. in an ice bath. To the cooled solution was added, with stirring, methylhydrazine (about 1.38 grams, 0.03 mole) dissolved in pyridine (about 10 milliliters). The resulting admixture was heated on a steam bath for about 1.5 hours and then concentrated by evaporation in vacuo using a water bath at about 60° C.

To the obtained residue was added dry toluene (about 100 milliliters) and p-toluenesulfonic acid (about 200 milligrams) and the thus-formed mixture was then refluxed for about 16 hours using a water trap. A toluene solution resulted and was decanted leaving behind a small amount of a tarry substance.

The decanted toluene solution was washed with an aqueous 1 weight percent sodium hydroxide solution, and thereafter the toluene was removed by evaporation. The residue remaining after the evaporation of toluene was recrystallized from cyclohexane.

About 2.12 grams of crystals in the form of tan prisms melting at about 122°-125.5° C. was obtained. The crystals were identified as 6-chloro-2-methyl-4-phenyl-2H-1,2,3-benzothiadiazine-1,1-dioxide, identical with the product of Example XIV.

*Analysis.*—Calcd. for $C_{14}H_{11}ClN_2O_2S$: C, 54.81; H, 3.62; Cl, 11.56; N, 9.13; S, 10.45. Found: C, 55.04; H, 3.83; Cl, 11.95; N, 8.87; S, 10.18.

In a similar manner, 2-methyl-6-butyl-8-propyl-4-phenyl-2H-1,2,3-benzothiadiazine-1,1-dioxide can be produced from 2-benzoyl-4-butyl-6-propylbenzenesulfonyl chloride, 2-methyl-7-ethyl-4-(4-butylphenyl)-1,2,3-benzothiadiazine-1,1-dioxide from 2-benzoyl-4'-butyl-5-ethylbenzenesulfonyl chloride, etc.

EXAMPLE XVI

*Preparation of 2-acetyl-6-chloro-4-phenyl-2H-1,2,3-benzothiadiazine-1,1-dioxide*

A solution was prepared of 6-chloro-4-phenyl-2H-1,2,3-benzothiadiazine-1,1-dioxide (about 3.9 grams, 0.013 mole), acetyl chloride (about 10 milliliters), and chloroform (about 50 milliliters). The solution was refluxed for about one hour and then concentrated in vacuo by evaporation. A glassy residue was obtained and was triturated with diethyl ether. The resulting admixture was filtered.

About 3.85 grams of a white solid melting at about 139°-140.5° C. was recovered. After two recrystallizations from diethyl ether, the white solid was observed to have a constant melting point of about 140°-142° C. The white solid was identified as 2-acetyl-6-chloro-4-phenyl-2H-1,2,3-benzothiadiazine-1,1-dioxide, obtained in about 86.7 percent yield.

*Analysis.*—Calcd. for $C_{15}H_{11}ClN_2O_3S$: C, 53.82; H, 3.31; Cl, 10.59; N, 8.37; S, 9.58. Found: C, 53.92; H, 2.93; Cl, 10.84; N, 8.88; S, 9.66.

In a like manner, by using propionyl chloride in lieu of acetyl chloride the 2-propionyl-6-chloro-4-phenyl-2H-1,2,3-benzothiadiazine-1,1-dioxide can be prepared, by using butyryl chloride the 2-butyryl-6-chloro-4-phenyl-2H-1,2,3-benzothiadiazine-1,1-dioxide can be prepared, by using isovaleryl chloride the 2-isovaleryl-6-chloro-4-phenyl-2H-1,2,3-benzothiadiazine-1,1-dioxide can be prepared etc.

EXAMPLE XVII

*Preparation of 3,4-dihydro-4-phenyl-6-chloro-2H-1,2,3-benzothiadiazine-1,1-dioxide*

A solution of 6-chloro-4-phenyl-2H-1,2,3-benzothiadiazine-1,1-dioxide (about 5.84 grams, 0.02 mole) in acetic acid (about 150 milliliters) was hydrogenated in the presence of platinum oxide catalyst (about 200 milligrams) at an initial pressure of about 50 pounds per square inch gauge. Uptake of the theoretical amount of hydrogen required about 40 minutes. Thereafter, the platinum oxide catalyst was removed by filtration, and the filtrate was concentrated in vacuo.

The residue obtained from evaporation was stirred with water, and filtered. The resulting filter cake was washed with water and then recrystallized from isopropanol. About 3.6 grams of prismatic, colorless crystals melting at about 142° C. (dec.) was obtained. The crystals were identified as 3,4 - dihydro - 4-phenyl-6-chloro-2H-1,2,3-benzothiadiazine-1,1-dioxide obtained in about 61 percent yield.

*Analysis.*—Calcd. for $C_{13}H_{11}ClN_2O_2S$: C, 52.97; H, 3.76; Cl, 12.03; N, 9.51; S, 10.88. Found: C, 52.96; H, 3.59; Cl, 11.72; N, 9.77; S, 10.78.

In an analogous manner, 3,4-dihydro-4-phenyl-2H-1,2,3-benzothiadiazine-1,1-dioxide can be prepared from 4-phenyl - 2H-1,2,3-benzothiadiazine-1,1-dioxide, 3,4-dihydro - 6,7 - dimethyl-4-(4-propylphenyl)-2H-1,2,3-benzothiadiazine-1,1-dioxide can be prepared from 6,7-dimethyl - 4 - (4-propylphenyl)-2H-1,2,3-benzothiadiazine-1,1-dioxide, 2 - butyl-3,4-dihydro-6-trifluoromethyl-4-(3,5-dichlorophenyl) - 2H-1,2,3-benzothiadiazine-1,1-dioxide can be prepared from 2-butyl-6-trifluoromethyl-4-(3,5-dichlorophenyl)-2H-1,2,3-benzothiadiazine-1,1-dioxide, etc.

The corresponding hydrochlorides of the foregoing 3,4-dihydro derivatives of 2H-1,2,3-benzothiadiazine-1,1-dioxides can be prepared by adding an excess of ethereal hydrogen chloride to the 3,4-dihydro derivative dissolved in a suitable solvent such as benzene, toluene, diethyl ether, or the like, and recovering the resulting precipitate by means of conventional laboratory techniques.

Similarly, the addition of ethereal sulfuric acid will produce the corresponding hydrogen sulfate, the addition of an ethanolic solution of maleic acid will produce the corresponding maleate, etc.

I claim:

1. A compound selected from the group consisting of a 2H-1,2,3-benzothiadiazine-1,1-dioxide represented by the structural formula

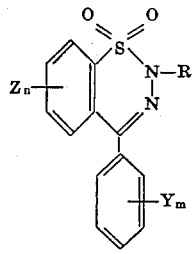

wherein R is a member of the group consisting of hydrogen, alkyl, and alkanoyl radicals, Z and Y are members of the group consisting of halo, trifluoromethyl, alkyl, and alkoxy radicals, and $n$ and $m$ are integers having a value from 0 to 3, inclusive, with the proviso that the alkyl portions of the foregoing radicals contain no more than four carbon atoms; [and] the corresponding 3,4-dihydro derivatives thereof; and the acid addition salts of said 3,4-dihydro derivatives.

2. The 2H - 1,2,3-benzothiadiazine-1,1-dioxide in accordance with claim 1 wherein R is hydrogen and $n$ and $m$ are zero.

3. The 2H - 1,2,3-benzothiadiazine-1,1-dioxide in accordance with claim 1 wherein R is acetyl, Z is chloro situated in the 6-position, $n$ is 1, and $m$ is zero.

4. The 2H - 1,2,3-benzothiadiazine-1,1-dioxide in accordance with claim 1 wherein R is hydrogen, Z is chloro situated in the 6-position, $n$ is 1, and $m$ is zero.

5. The 2H - 1,2,3-benzothiadiazine-1,1-dioxide in accordance with claim 1 wherein R is methyl, Z is chloro situated in the 6-position, $n$ is 1, and $m$ is zero.

6. The 3,4 - dihydro-2H-1,2,3-benzothiadiazine-1,1-dioxide in accordance with claim 1 wherein R is hydrogen, Z is chloro situated in the 6-position, $n$ is 1, and $m$ is zero.

7. A process for the preparation of a 2H-1,2,3-benzothiadiazine-1,1-dioxide which comprises reacting in an inert organic solvent a 2-benzoylbenzenesulfonyl halide with a member of the group consisting of hydrazine, hydrazine hydrate, and alkylhydrazine.

8. A process for the preparation of a 3,4-dihydro-2H-1,2,3-benzothiadiazine-1,1-dioxide which comprises reacting in an inert organic solvent a 2-benzoylbenzenesulfonyl halide with a member of the group consisting of hydrazine, hydrazine hydrate, and alkylhydrazine so as to produce a 2H-1,2,3-benzothiadiazine-1,1-dioxide and thereafter hydrogenating said 2H-1,2,3-benzothiadiazine-1,1-dioxide.

References Cited

UNITED STATES PATENTS 2,402,611  6/1946  Dickey et al. _____ 260—243

FOREIGN PATENTS 928,552  6/1963  Great Britain.

HENRY R. JILES, *Primary Examiner.*

J. M. FORD, *Assistant Examiner.*

U.S. DEPARTMENT OF COMMERCE

PATENT OFFICE

Washington, D.C. 20231

UNITED STATES PATENT OFFICE

CERTIFICATE OF CORRECTION

Patent No. 3,407,197  October 22, 1968

John B. Wright

It is certified that error appears in the above identified patent and that said Letters Patent are hereby corrected as shown below:

Column 9, line 46, "was discovered" should read -- was dissolved --. Column 11, line 24, "atoms; [and] the" should read -- atoms; the --.

Signed and sealed this 10th day of March 1970.

(SEAL)
Attest:

Edward M. Fletcher, Jr.  WILLIAM E. SCHUYLER, JR.
Attesting Officer  Commissioner of Patents

FOR FILMING